Patented Nov. 11, 1941

2,262,262

UNITED STATES PATENT OFFICE 2,262,262

PROCESS OF MAKING MALEANILS

John H. Speer, Niles Center, Ill., assignor to National Aniline and Chemical Company, Inc., New York, N. Y., a corporation of New York No Drawing. Application August 19, 1939,
Serial No. 291,003

8 Claims. (Cl. 260—313)

This invention relates to a process of making maleanils, that is, the class of compounds represented by the general formula:

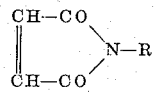

in which R is a substituted or unsubstituted aryl radical, from the corresponding maleanilic acids, represented by the general formula:

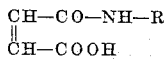

It is known that maleanilic acids react with acidyl chlorides to form chlorsuccinanils and to form isomers of the maleanils. The latter may be represented by the formula:

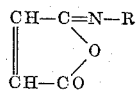

See, for instance, Gazetta Chimica Italiana 28, II, pp. 189–192; Annalen der Chemie, 309, p. 347; and Atti della Reale Accademia dei Lincei, (5), 18, II, pp. 312–326. For this reason treatment of maleanilic acids with acidyl chlorides (or with acidyl bromides) has not been applied to the preparation of maleanils.

According to my invention a maleanilic acid corresponding to the desired maleanil is converted into the latter by treatment with an organic or inorganic acidyl chloride or acidyl bromide at a temperature between about 160° and about 200° C.

I have discovered that at temperatures between about 160° and about 200° C. maleanils are obtained in substantial yields from the treatment of maleanilic acids with acidyl chlorides or bromides, and without any accompanying substantial production of chlorsuccinanils or bromsuccinanils, or isomers of maleanils. At such temperatures the addition of hydrogen chloride and hydrogen bromide to the maleanil product is apparently inhibited and the hydrogen chloride or bromide formed as a reaction product is largely driven off from the reaction mixture as formed.

Examples of acidyl chlorides and acidyl bromides are: thionyl chloride (SOCl₂), phosphorus trichloride (PCl₃), acetyl chloride (CH₃COCl), thionyl bromide, phosphorus tribromide, and acetyl bromide. The substances listed are all readily volatile, boiling below 200° C., and the use of such volatile acidyl chlorides and bromides is preferred. Thionyl chloride, a preferred treatment agent, has a boiling point of 78° C.

Preferably the maleanilic acid to be treated is suspended in a suitable liquid medium, which is inert to the reacting materials, and while the mixture is maintained at a temperature between 160° and 200° C., the selected acidyl chloride or bromide treatment agent is gradually introduced until the reaction is complete, which will be indicated when the formation of hydrogen chloride or bromide gas ceases. The treatment agent may be added directly to the mixture, or may be volatilized and mixed with a stream of dry air or other suitable gas and the resulting stream of gas and vapor may be passed into the mixture of maleanilic acid and liquid medium.

I prefer to use an inert solvent which with the maleanilic acid forms a mixture boiling between 160° and 200° C., and to maintain the reaction mixture automatically at a temperature within this range by maintaining the mixture in a boiling state. By conducting the reaction in a vessel provided with a reflux condenser, loss of solvent is prevented and the hydrogen chloride or hydrogen bromide which is evolved is expelled from the chamber through the condenser. Commercial dichlorbenzene has been found to be very satisfactory for use as a solvent, and I prefer to use ortho-dichlorbenzene, which has a boiling or refluxing temperature of about 180° C. Other examples of inert solvents having suitable reflux boiling temperatures are tetralin, kerosene, and commercial cymene. Although the character of the particular maleanilic acid being reacted and its reaction product may alter the boiling temperature of a solution, it is possible even in extreme cases, by providing sufficient solvent, to adjust the boiling temperature of the solution to approximately that of the solvent. At the end of the reaction, continued boiling of the solvent mixture under reflux will serve to drive off the remaining hydrogen chloride or hydrogen bromide and other volatile undesired substances present, following which the solvent may be removed by distillation under atmospheric pressure, or in any other suitable manner.

My invention also contemplates conducting the reaction in liquid media which boil substantially above 200° C., for example, solutions employing, as solvent, naphthalene or molten paraffin. Such solutions must be maintained at a temperature below the normal boiling point in order to provide a suitable reaction temperature. By conducting the reaction under pressure sufficient to raise the boiling point to the desired reaction temperature, media having boiling points below the desired reaction temperature may be used.

Upon completion of the reaction, the residual hydrogen chloride or hydrogen bromide is driven off by continued heating, together with any excess acidyl chloride or acidyl bromide if a readily volatile form has been used. When thionyl chloride or bromide is used, sulfur dioxide will be formed as one reaction product thereof and is readily driven off along with the hydrogen chloride or bromide during the course of the reaction and during the subsequently continued heating, so that no reaction products from the acidyl chloride or bromide will remain. When phosphorus trichloride or tribromide is used, a residual amount of phosphorus-containing material will remain and can be removed by cooling the mixture and washing with a weakly alkaline solution (such as an aqueous 5% to 10% sodium carbonate solution) and then with water.

The resultant solvent mixture may be freed of solvent by distilling off the latter at atmospheric pressure or lower. When a solvent having a boiling point substantially in excess of 200° C. has been used, care should be taken not to allow the temperature of the mixture to greatly exceed 200° C. for an appreciable time, as otherwise substantial decomposition of the maleanil will occur.

The distillation residue contains the maleanil product and the latter is separated out in any convenient manner. For example, the residue may be subjected to fractional distillation under vacuum (such as 4 mm. to 5 mm. mercury absolute pressure) and the fraction containing the bulk of the maleanil may be isolated as the crude maleanil product. The latter may be purified by crystallization from alcohol to yield a substantially pure maleanil.

The following examples illustrate the preparation of typical maleanils from corresponding maleanilic acids in accordance with my invention. In these examples, "parts" means parts by weight.

*Example 1.*—This example illustrates the preparation of maleanil using maleic anhydride and aniline as the raw materials to form maleanilic acid, which is then converted into maleanil by interaction with thionyl chloride, both reactions being conducted in dichlorbenzene which does not enter into the reactions. The reactions involved in this combined process may be represented as follows:

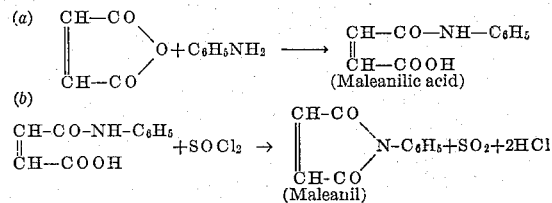

In a suitable apparatus fitted with an agitator and a reflux condenser, 98 parts of maleic anhydride were dissolved in 665 parts of commercial ortho-dichlorbenzene (which served as the inert solvent). The solution was rapidly agitated and 93 parts of aniline were slowly added, reacting with the maleic anhydride to form maleanilic acid, and the resulting slurry was then heated to the boiling or refluxing temperature of about 180° C. A dry stream of air was passed through a vessel containing thionyl chloride warmed to about 60° C. and then passed slowly through the refluxing mixture of solvent and maleanilic acid. The latter gradually dissolved. 125 parts of the thionyl chloride were vaporized and introduced into the refluxing mixture in this manner, reacting with the maleanilic acid to form maleanil, sulfur dioxide, and hydrogen chloride, the latter two reaction products largely passing off through the reflux condenser. In order to remove residual sulfur dioxide and hydrogen chloride from the mixture, refluxing was continued for about one hour after the last of the thionyl chloride had been passed into the mixture.

The bulk of the dichlorbenzene solvent was then removed by distillation at atmospheric pressure, and the resultant residual mixture was distilled in vacuo. Fractional distillation at 5 mm. (mercury) pressure was employed for separation of the maleanil, the fraction distilling off between 140° and 155° C. being collected separately as crude maleanil. The yield was 82 parts. The crude product was a bright yellow crystalline solid having a freezing point of 85° C. It was dissolved in and crystallized from alcohol, yielding purified maleanil which was found to have a melting point of 89.5° C.

*Example 2.*—60 parts of the mono-metachloranilide of maleic acid, having the formula:

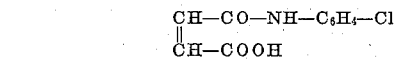

were suspended in 330 parts of commercial orthodichlorbenzene, the mixture was heated to its refluxing temperature of about 180° C., and a stream of dry air carrying the vapors from 33 parts of thionyl chloride was passed through the mixture, in the manner described in Example 1. After removal of the solvent dichlorbenzene by distillation at atmospheric pressure, the residue was distilled in vacuo and the fraction which distilled between about 170° and about 183° C. at 5 mm. pressure was collected separately as the desired product. This product, which was substantially 3'-chlor-1-maleanil, having the formula:

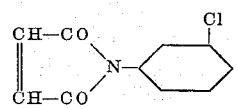

was very soluble in hot, sparingly soluble in cold, alcohol. It was crystallized from an alcoholic solution as pale yellow prisms having a melting point of 93° C.

*Example 3.*—Using the same procedure as in the preceding example, the mono-2',3'-methylchloranilide of maleic acid was suspended in boiling commercial dichlorbenzene and was converted by means of thionyl chloride to the corresponding 2'-methyl-3'-chlor-1-maleanil:

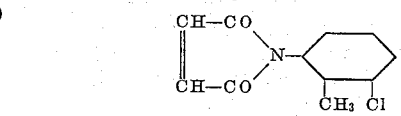

which was separated from the residue, after removal of the solvent, by distillation in vacuo. The portion boiling at 4 mm. pressure between 160° and 175° C. was collected separately as the fraction containing the desired maleanil. After crystallizing the product from alcohol, the purified maleanil was an almost white crystalline solid having a melting point of 69.5° C.

*Example 4.*—This example illustrates the use of phosphorus trichloride (boiling point 76° C.) in place of thionyl chloride as the treatment agent. The procedure of Example 1 was employed, the same substances and amounts being used except that 55 parts of phosphorus trichloride were used in place of 125 parts of thionyl chloride. When the reaction was complete and substantially all the remaining hydrogen chloride driven off by continued refluxing, the dichlorbenzene mixture was cooled and shaken with several portions of a 10% by weight solution of soda ash, and then with water. The aqueous additions were allowed to settle and were removed from the oily layer. The latter was then distilled under atmospheric pressure to remove the dichlorbenzene, and the portion containing the maleanil was isolated by fractional distillation in vacuo, as described in Example 1. The yield of maleanil was 30 parts.

*Example 5.*—This example illustrates the use of an acidyl bromide in place of an acidyl chloride.

In a suitable apparatus fitted with a reflux condenser and agitator, 98 parts of maleic anhydride were dissolved in 650 parts of commercial ortho-dichlorbenzene. The solution was rapidly agitated and 93 parts of aniline were slowly added. The resulting slurry of maleanilic acid was heated to its refluxing temperature (about 180° C.), and 100 parts of phosphorus tribromide were added very slowly over a period of about 45 minutes. Refluxing of the mixture was continued for about two more hours to expel substantially all hydrogen bromide. The mixture was then cooled to a convenient temperature (e. g., between about 10° and 50° C.) and filtered to remove insoluble impurities such as the phenyl aspartate. The clear filtrate was washed successively with water, a dilute aqueous sodium carbonate solution (between 5% and 10% strength), and again with water. The neutral wet oil was separated, and distilled under atmospheric pressure to remove most of the dichlorbenzene.

The residue was then distilled in vacuo. The fraction distilling at 4 mm. pressure between 138° and 148° C. was collected separately as crude maleanil, and was found to be substantially the same as that obtained in Examples 1 and 4. The yield of crude maleanil was 85 parts.

Having described several embodiments of my invention, but without any intent to be limited thereto, as various modifications and alternatives will be evident to those skilled in the art, what I claim is as follows:

1. A process of making maleanils comprising treating a maleanilic acid at a temperature of about 160–200° C. with a reagent of the class of chlorides and bromides the formulae of which are derived by substituting at least one of the OH groups of organic and inorganic acids by a halogen of the group consisting of chlorine and bromine.

2. A process of converting a maleanilic acid into the corresponding maleanil, comprising treating said maleanilic acid with thionyl chloride at a temperature of about 160–200° C.

3. A process of converting a maleanilic acid into the corresponding maleanil, comprising treating said maleanilic acid with phosphorus trichloride at a temperature of about 160–200° C.

4. A process of converting a maleanilic acid into the corresponding maleanil, comprising treating said maleanilic acid with phosphorus tribromide at a temperature of about 160–200° C.

5. A process of making maleanils comprising contacting a solution of a maleanilic acid in an inert solvent having a reflux temperature between about 160° and about 200° C. and passing through the mixture a stream of air containing in vapor phase a reagent of the class of volatile chlorides and bromides the formulae of which are derived by substituting at least one of the OH groups of organic and inorganic acids by a halogen of the group consisting of chlorine and bromine, while refluxing the mixture so as to maintain the mixture at a temperature between about 160° and about 200° C. and so as to expel hydrogen chloride or bromide substantially as formed therein.

6. The process of making a maleanil, which comprises introducing a stream of air containing thionyl chloride vapor into a solution of a maleanilic acid in hot ortho-dichlorbenzene at substantially atmospheric pressure and at the same time refluxing the mixture so as to maintain it at a temperature between about 160° C. and about 200° C. and so as to expel hydrogen chloride substantially as formed.

7. The process of making a maleanil, which comprises introducing a stream of air containing thionyl chloride vapor into a solution of a maleanilic acid in hot ortho-dichlorbenzene at substantially atmospheric pressure and at the same time refluxing the mixture so as to maintain it at a temperature between about 160° C. and about 200° C. and so as to expel hydrogen chloride substantially as formed, subsequently distilling off the bulk of the ortho-dichlorbenzene at about atmospheric pressure, and separating the maleanil from the residue by fractional distillation in vacuo.

8. The process of making a maleanil, which comprises introducing a stream of air containing thionyl chloride vapor into a solution of a maleanilic acid in hot ortho-dichlorbenzene at substantially atmospheric pressure and at the same time refluxing the mixture so as to maintain it at a temperature between about 160° C. and about 200° C. and so as to expel hydrogen chloride substantially as formed, subsequently distilling off the bulk of the ortho-dichlorbenzene at about atmospheric pressure, separating the maleanil from the residue by fractional distillation in vacuo, and purifying the crude maleanil by fractional crystallization.

JOHN H. SPEER.